United States Patent [19]
Hashemi et al.

[11] Patent Number: 5,545,277
[45] Date of Patent: Aug. 13, 1996

[54] PLATE GLASS EDGE STRENGTH

[75] Inventors: Amin H. Hashemi, Farmington Hills; David N. Heilman, Monroe, both of Mich.

[73] Assignee: Ford Motor Company, Dearborn, Mich.

[21] Appl. No.: 317,046

[22] Filed: Oct. 3, 1994

[51] Int. Cl.⁶ .......................... B32B 17/10; B32B 31/12; B32B 33/00; C03B 23/025
[52] U.S. Cl. ............................. 156/106; 65/61; 65/107; 156/153; 156/256; 156/263; 156/267; 428/192; 451/44
[58] Field of Search ................... 156/89, 99, 101, 156/102, 106, 152, 153, 154, 250, 256, 257, 263, 267; 65/61, 107; 451/44; 428/192

[56] References Cited

U.S. PATENT DOCUMENTS

| | | | |
|---|---|---|---|
| 1,596,105 | 8/1926 | Kelly | 428/130 |
| 1,766,509 | 6/1930 | Grambach | 428/192 |
| 2,022,530 | 11/1935 | White | 451/44 |
| 3,843,472 | 10/1974 | Toussaint et al. | 428/192 |
| 3,956,547 | 5/1976 | DeTorre | 428/43 |
| 3,981,709 | 9/1976 | Kondo et al. | 65/30.14 |
| 4,068,441 | 1/1978 | Shaffer | 52/308 |
| 4,075,381 | 2/1978 | Furukawa et al. | 428/192 |
| 4,826,522 | 5/1989 | d'Iribarne et al. | 65/115 |
| 4,828,900 | 5/1989 | Mouly | 428/192 |
| 4,911,743 | 3/1990 | Bagby | 65/31 |

FOREIGN PATENT DOCUMENTS

| | | |
|---|---|---|
| 106762 | 8/1980 | Japan . |
| 101360 | 8/1980 | Japan . |
| 6369728 | 8/1988 | Japan . |

Primary Examiner—Michael W. Ball
Assistant Examiner—Francis J. Lorin
Attorney, Agent, or Firm—Lorraine S. Melotik

[57] ABSTRACT

This invention relates to first and second plate glass templates each having an outer smooth major surface and an inner rough major surface, only each of the major outer smooth surfaces being peripherally bounded by a chamfer formed at the cut edge. In this invention, the first and second templates are joined together with the rough surfaces in facing retention. The first and second plate glass templates may be used in forming a window.

10 Claims, 1 Drawing Sheet

PLATE GLASS EDGE STRENGTH

FIELD OF THE INVENTION

This invention relates to the cutting, chamfering and, orientation a pair of plate glass templates, e.g., those used to form a laminated windshield.

BACKGROUND OF THE INVENTION

Laminated glass assemblies have been prepared by bonding two plate glass templates together with an intermediate plastic layer such as polyvinyl butyral layer. These laminates have been widely used as windshields for automobiles. The two glass templates have been made thinner over the years to help reduce the weight of automobiles. In order to improve their strength, the glass is generally subjected to annealing or tempering. This thinner glass may be chipped or broken when a shock is delivered to the edges of the glass, which may take place during transportation of the glass or when the assembly is being embedded in the frame of an automobile.

Methods have been proposed to improve the edge strength of plate glass (float or sheet) and hence reduce its fragility. U.S. Pat. No. 3,843,472 to Toussaint et al. discloses improving the edge strength of a glass article by abrading the edge of the glass to smoothen or polish it and subjecting it to chemical tempering and a rectifying treatment. Abrading or grinding the edges of glass, also commonly termed "chamfering" or "seaming", is routinely used in the glass manufacturing industry to improve the edge strength of glass. U.S. Pat. No. 4,075,381 to Furukawa et al. discloses a method to improve the edge strength of a laminated windshield by providing the laminated windshield with a particular compressive stress in the outer surfaces.

In forming a glass windshield two plate glass templates 12 and 14 are positioned relative one another as shown in FIG. 1, and would include therebetween in the finished product an interposed plastic layer 16 to form a laminated windshield. Plate glass template 12 has two major surfaces, conveniently spoken of as surfaces #1 and #2 in the glass industry. The #1 surface is the smooth major surface and faces outside toward the environment when the windshield is installed in a vehicle. It is considered in the glass industry to be the "smooth" major surface because it is the surface in direct contact with the molten tin during the float-bath production of the plate glass. Float-glass processing is the conventional way of producing sheet glass, used for automotive and architectural uses, throughout the world. Major surface #2 is considered the rough major surface, i.e., compared to major surface #1, simply because it was not formed in direct contact with the molten tin bath. Plate glass template 14 of FIG. 1 likewise has a smooth major surface, surface #4, and a rough major surface, #3. Surface #4 would face the inside of the vehicle when installed. Therefore, major surfaces #2 and #3 are in facing retention in a windshield assembly.

In current conventional production of a laminated windshield, a first plate glass template, e.g., 12' of FIG. 2, is formed by scribing an indentation into the rough major surface of a glass sheet in a desired window pattern and then the glass outside the scribed pattern is removed. This cut edge (i.e., the edge adjacent major surface #2 of template 12' of FIG. 2) is chamfered as shown as 22 in FIG. 2. The so-called "uncut" or "broken" edge (i.e., the edge adjacent major surface #1 of template 12' of FIG. 2) is likewise chamfered as shown as 20 in FIG. 2. Plate glass template 14' of FIG. 2 (the second template in the windshield) is produced differently from template 12' in that, in current conventional production, it is smooth major surface #4 which is scribed. The cut edge is chamfered as shown as 26 in FIG. 2 and likewise the uncut edge is chamfered as shown as 24 in FIG. 2. As discussed above, rough major surfaces #2 and #3 are in facing retention, with surface #1 facing the outside of the vehicle and surface #4 facing the inside of the vehicle when installed. It was previously theorized that this is the optimal way to manufacture the glass template pairs having the greatest edge strength because any micro-cracks which may have been formed in cut edges #2 and #4 would be "sealed up" as the windshield is curved back toward surface #4 during windshield shaping.

It would be highly desirable if the edge strength of the plate glass template pairs and the resulting laminated windshield could be further improved. This would reduce even further the number of template pairs and windshields which are scrapped because of breakage during storage, shipment, or attempted installation into a vehicle. It would be further desirable if this could be done by a less costly and time consuming method than that currently employed in manufacturing windshields. The present invention has unexpectedly been found to provide significant edge strength improvements over those conventionally carried out as described above and does so by a less complex method.

DISCLOSURE OF THE INVENTION

This invention is directed to a first plate glass template and a second plate glass template each having a smooth major surface and a rough major surface, each of the major smooth surfaces only being peripherally bounded by a chamfer formed at the cut edge, and the first and second templates are joined together with the rough major surfaces in facing retention. Such templates are useful, e.g., in making a laminated windshield including a plastic interlayer. This invention according to another embodiment is directed to a process of forming a first plate glass template and a second plate glass template each having a smooth major surface and a rough major surface, said process comprising the steps of: (1) forming a first plate glass template by: scribing an indentation into the smooth major surface of a glass sheet in a desired pattern; removing the glass outside said scribed pattern to obtain the first plate glass template having a peripheral edge; machining the peripheral edge of the first plate glass template to define a chamfer coextensive with and removing the indentation; (2) forming a second plate glass template by: scribing an indentation into the smooth major surface of a glass sheet in a pattern substantially identical to that of the first template; removing the glass outside the scribed pattern to obtain the second plate glass template having a peripheral edge, machining the peripheral edge of said second plate glass template to define a chamfer coextensive with and removing the indentation; and (3) joining said first and second plate glass templates with the rough major surfaces in facing relationship. The process preferably further comprises shaping the pair of plate glass templates using heat to soften the glass templates and form them into a desired contour, and preferably is a process for forming a window, most preferably being a laminated window. Advantageously, the present invention increases the edge strength of pairs of glass templates, increasing both the compressive and tensile strength which the pairs exhibit when subjected to compressive and tension loads on the edges, which improves the ability of such glass templates to maintain their integrity during handling, shipping, and installation.

DETAILED DESCRIPTION OF THE PREFERRED EMBODIMENTS

Figure 1:
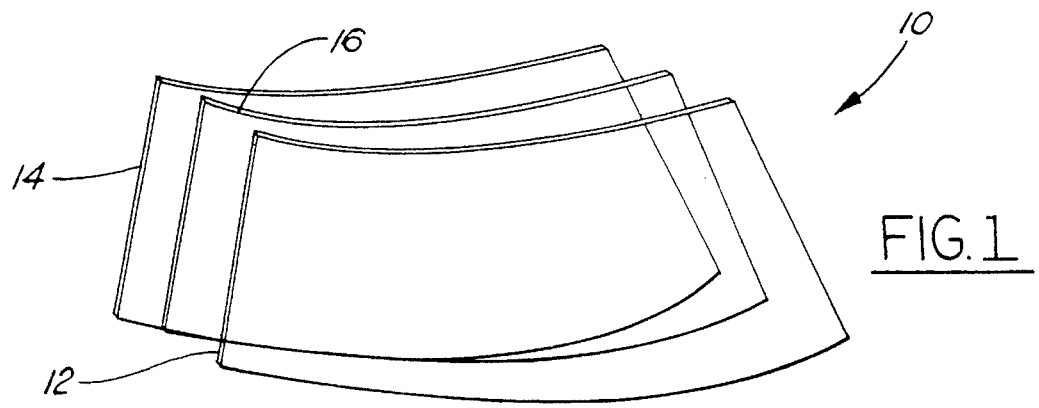
FIG. 1 is a schematic view of a windshield including two plate glass templates and an interposed plastic layer.

The present invention will now be described in detail by reference to the accompanying drawings. While the present invention is relevant to any set of glass templates, e.g., those used to make windows, and particularly laminated windows like windshields, it will be described for simplicity in the following paragraphs relative a windshield assembly embodiment of the present invention. As discussed above, FIG. 1 shows a general windshield assembly including two plate glass templates 12 and 14 and interposed plastic layer 16. According to the present invention, first and second plate glass templates, 12 and 14 are formed (in either order) as follows. A first plate glass template 12" of FIG. 3 is formed by scribing an indentation into the smooth major surface of a glass sheet in a desired pattern, e.g., a window pattern. Then the glass outside the scribed pattern is removed to obtain the first plate glass template having a peripheral edge. The scribing of the glass in the desired window pattern and the removal of the glass outside the scribed pattern can be carried out in various ways as would be appreciated by those skilled in the art in view of the present disclosure, neither being critical to this invention. For example, the glass may be scribed with a scribing wheel as generally carried out in the industry. Removal of the glass outside the scribed area is often by mechanical, pneumatic, or thermal techniques as would be known to those skilled in the art. The peripheral edge of the first plate glass template 12" (FIG. 3) is machined, e.g., as by grinding or abrading, to define a chamfer coextensive with and removing the indentation. This results in a plate glass template 12" having, on the cut edge, a chamfer 30 as shown in FIG. 3. A second plate glass template 14" in FIG. 3 is likewise formed by scribing an indentation into the smooth major surface of a glass sheet in a pattern substantially identical to that of the first template (12" of FIG. 3). Then the glass outside the scribed pattern is removed to obtain the second plate glass template having a peripheral edge. As with the first plate glass template, the peripheral edge of the second plate glass template is machined, as by grinding or abrading, to define a chamfer coextensive with and removing the indentation. The resulting chamfer in this cut edge is shown as 36 in FIG. 3. The angle or the particular shape of the chamfer is not critical to the invention, as it may be rounded or flat. Preferably, however, the chamfers are flat and at an angle roughly 45° relative to the major smooth surface of the template. According to this invention, the uncut edges 32 and 34 of templates 12" and 14", respectively, are not machined (chamfered). Hence, manufacturing template pairs according to the present invention is less costly than manufacturing as described in the above prior art (FIG. 2) because it requires that only two of the edges, i.e., only the cut edges, are machined, rather than all four edges as is conventionally done in the prior art (FIG. 2).

In the present invention, the first and second plate glass templates are joined with the rough surfaces (major surfaces #2 and #3) in facing retention. This is not meant to suggest that the glass templates are adhered to one another, they only need be placed with the rough surfaces in facing retention to one another. While it is most preferable that the peripheral edges of each of the plate glass templates are machined prior to joining the two plate glass templates together, it may in some situations be preferred to machine the peripheral edge of the plate glass templates after the templates have been joined together. This embodiment is also within the scope of this invention.

Figure 2:
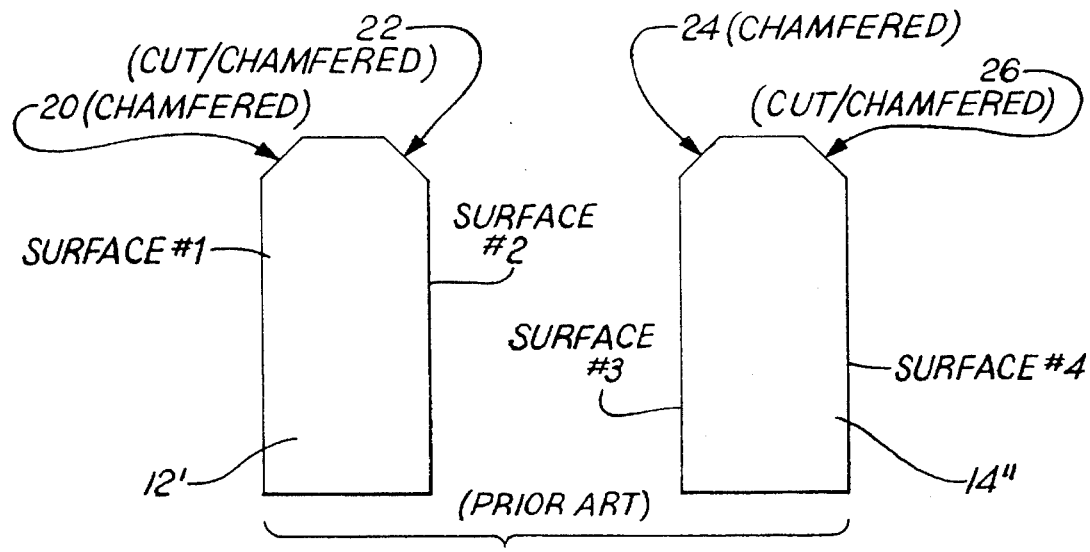
FIG. 2 is a sectional view illustrating a pair of prior art plate glass templates as are conventionally used in manufacturing a laminated windshield.
Figure 3:
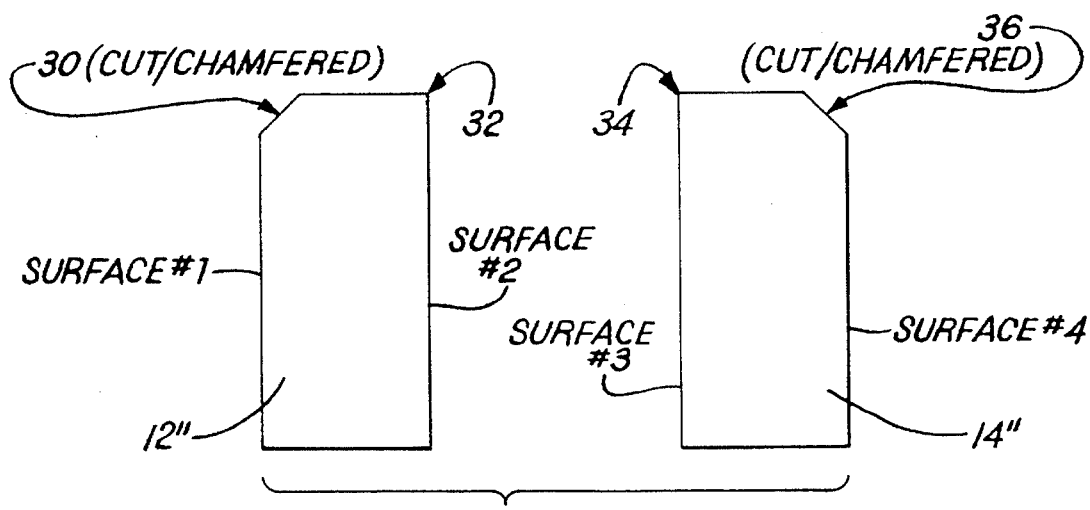
FIG. 3 is a sectional view illustrating a pair of plate glass templates according to an embodiment of the present invention.

As pointed out above, and as shown in prior art FIG. 2, conventionally the edges adjacent each of the major surfaces of each of the two glass templates used in forming a windshield are chamfered, i.e., those adjacent surfaces #1, #2, #3, and #4 are chamfered. In contrast, in the present invention, only the edge adjacent surfaces #1 and #4 are chamfered as shown in FIG. 3. Further, in the prior art FIG. 2 templates in contrast to those of this invention, one of the templates is cut on the smooth major surface and the other template is cut on the rough major surface. While the inventors do not wish to be bound by theory, they believe that the advantages realized from their invention derive from the fact that in their invention, only the major smooth surface has been subjected to scribing to form an indentation and then the indentation formed by the scribing (which later results in a cut edge, sometimes termed in the industry a scored edge) is machined to remove the indentation. It is believed that the machining, which forms the chamfer, removes the imperfections or micro-cracks which occur in the region of the indention in the glass during scribing and hence removes potential sites for the propagation of future cracks. Additionally, by being scribed on the smooth major surface, it is believed that the glass is less likely to develop micro-cracks during the scribing in the region of the indention. Thus, scribing only in the smooth major surface and then machining so to remove the indentation formed during scribing, is believed to synergistically act to strengthen the glass template pairs. Neither of the peripheral edges adjacent the rough major surfaces are machined.

While the above discussions have focused on one embodiment of the present invention, that directed to making windshields using the invention process, the invention is not meant to be so limited. The invention process can be used in forming any window comprising two plate glass templates, either with or without an interlayer, such as side automotive windows, architectural windows, etc. The particular glass composition employed in the present invention, and its thickness, is not critical herein. Commonly, a form of soda-lime-silica glass is used in most automotive and architectural glazing, but any glass composition may be employed. Generally, the glass plate used in automotive or architectural glazing has a thickness of between about 1.0 to 6.0 mm, although the templates of this invention are not to be so limited. In this invention, the first and second plate glass templates may be of the same or different thickness. In the case of windshields and architectural glazing, the plate glass used is often subjected to annealing or tempering to improve the strength of the glass and control its fracture characteristics. In many applications, a laminate is formed wherein the plate glass templates are interposed with a plastic layer, such as that made of polyvinylbutyral (PVC) or other polymeric material. Preferably, the PVC layer so employed has a thickness between about 0.5 mm and 4.0 mm, corresponding to between about 0.020 inches to 0.160 inches. As would be expected, if the joined glass templates are to have a special configuration as for a windshield, they may be subsequently shaped, e.g., as by subjecting the templates to heat and a mold. This may involve passing the pair of templates through a gas or electric hearth on a bending fixture and allowing the glass templates to conform to a mold by "sagging" or by subjecting the templates to heat and pressure in a mold. Still other methods of shaping the templates will be apparent to those skilled in the art in view of the present disclosure.

Thus, the most general embodiment of a final product according to the present invention comprises first and second plate glass templates each having an outer smooth major surface and an inner rough major surface and only each of the major outer smooth surfaces being peripherally bounded by a chamfer formed at the cut edge. In this product, the first and second templates are joined together with the rough surfaces in facing retention. While the invention process is directed to forming windows, as would be appreciated by those skilled in the art, the improvement realized by the first and second plate glass templates could be applied for other than windows, e.g., any automotive, architectural, or structural pair of glass templates, particularly laminates using first and second plate glass templates.

Embodiments of the first and second plate glass templates according to the present invention have shown improved compression load and tension load edge strength as compared to conventional chamfered glass as discussed above. Details of such improved edge strength is discussed in detail in the following example and the accompanying figures.

EXAMPLE I

Windshield template pair embodiments of the present invention were made as in the configuration shown in FIG. 3, some being formed into a laminated windshield by adding a PVB interlayer. For comparison, windshield templates pairs (and also laminated windshield using such templates) of the same glass composition and thickness were made as in the configuration shown in prior art FIG. 2. The edge strength of the template pairs and the laminated windshield were tested 0.24 inches from the template edge with the use of a three-point load device. As is known in the industry, such a device is commonly used to measure the mechanical tensile failure load in lbs. required to break glass. The comparative example template pair and resulting laminated windshield required a force of 24 and 32.2 lbs., respectively, to break the glass. In contrast, the invention embodiment template pair and resulting windshield laminate required a force of 51 and 54 lbs., respectively, to break the glass. From these results, it is seen that present invention embodiments of a template pair and resulting windshield laminate displayed a 112% and 68%, respectively, increase in the edge strength relative that of the comparative prior art example. It was also found, that when a pair of templates was made as described above for the invention embodiment, but modified (to form another comparative example) by chamfering the #2 and #3 edges (so that all four edges are chamfered), the edge strength of this modified comparative example decreased. That is, the force required to break the flat template pair with four chamfered edges (#1, #2, #3, and #4) decreased to 30 lbs. (from the 51 lbs. required for the invention embodiment with only two chamfered edges, #1 and #4).

EXAMPLE II

Another common way to currently manufacture windshields involves cutting the templates as described for FIG. 2 prior art template pairs (i.e., cutting surfaces #2 and #4) but, in contrast to that shown in FIG. 2, except that only the outer edges (near surfaces #1 and #4) are machined to provide chamfers 20 and 26. Thus, the edges adjacent surfaces #2 and #3 are not chamfered. Comparative example windshield templates were made in this modified way from a soda-lime-silica glass. Using this same glass, windshield templates were made according to embodiment of the present invention as shown in FIG. 3. Windshield template pairs as well as laminated windshields (with a PVC interlayer) were subjected to the test described in Example I. A comparative template pair of this example required 11.6 lbs. to break the pair while the invention embodiment pair in this example required 38.6 lbs. to break the pair. Thus, the invention embodiment pair displayed a 232% increase in edge strength. Similarly the comparative example laminated windshield and the laminated windshield of this example were subjected to the breakage test. The comparative example windshield required 18.0 lbs. to break, while the invention embodiment laminated windshield required 47.0 lbs. Thus, the invention embodiment windshield displayed a 161% increase in edge strength over that of the prior art comparative example.

In view of this disclosure, many modifications of this invention will be apparent to those skilled in the art. It is intended that all such modifications which fall within the true scope of the invention will be included within the terms of the appended claims.

We claim:

1. A process of forming a first plate glass template and a second plate glass template each having a smooth major surface and a rough major surface, said process comprising the steps of:

forming a first plate glass template by: scribing an indentation into the smooth major surface of a glass sheet in a desired pattern, removing the glass outside said scribed pattern to obtain said first plate glass template having a peripheral edge, machining the peripheral edge of said first plate glass template to define a chamfer coextensive with and removing said indentation;

forming a second plate glass template by: scribing an indentation into the smooth major surface of a glass sheet in a pattern substantially identical to that of said first template, removing the glass outside said scribed pattern to obtain said second plate glass template having a peripheral edge, machining the peripheral edge of said second plate glass template to define a chamfer coextensive with and removing said indentation; and joining said first and second plate glass templates with said rough surfaces in facing retention.

2. The process according to claim 1, wherein said chamfer is formed prior to joining said first and second templates together.

3. The process according to claim 1, wherein process further comprises shaping said templates after said first and second templates are joined together.

4. The process according to claim 3, wherein said shaping comprises heating said first and second templates and conforming said first and second templates to a mold.

5. The process according to claim 1, wherein said machining comprises grinding or abrading said edge.

6. The process according to claim 1, further comprising interposing a plastic layer between said first and second templates.

7. The process according to claim 6, wherein said plastic layer comprises polyvinylbutyral.

8. The process according to claim 6, wherein said process further comprises laminating said plastic interlayer with said first and second templates.

9. The process according to claim 1, wherein said first plate glass template and said second plate glass template are templates of an automotive windshield.

10. The process according to claim 1, wherein said first and second plate glass templates comprise annealed or tempered glass.

* * * * *